Oct. 11, 1966 E. LANGECKER 3,278,664
METHOD FOR PRODUCING HOLLOW BODIES
FROM THERMOPLASTIC MATERIALS
Filed Sept. 14, 1962 2 Sheets-Sheet 1
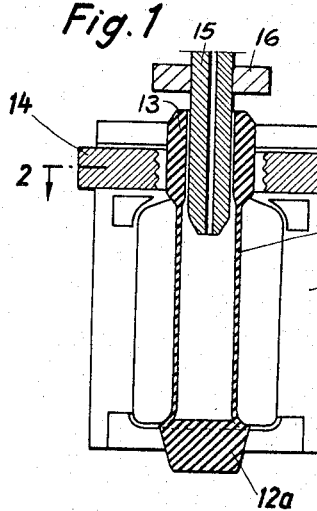
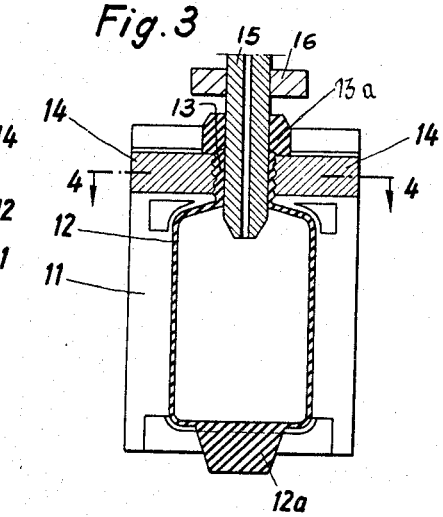
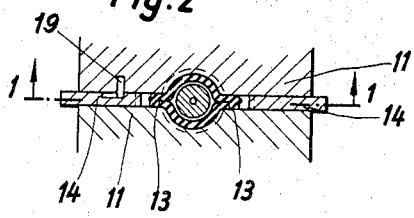
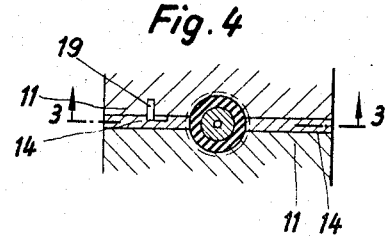
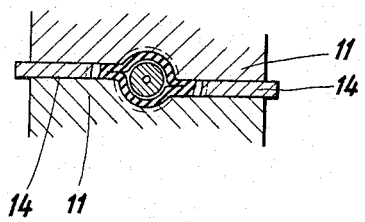
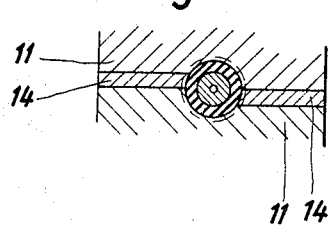
Inventor:
ERHARD LANGECKER
By Irwin S. Thompson
ATTY.

Oct. 11, 1966 E. LANGECKER 3,278,664
METHOD FOR PRODUCING HOLLOW BODIES
FROM THERMOPLASTIC MATERIALS
Filed Sept. 14, 1962 2 Sheets-Sheet 2
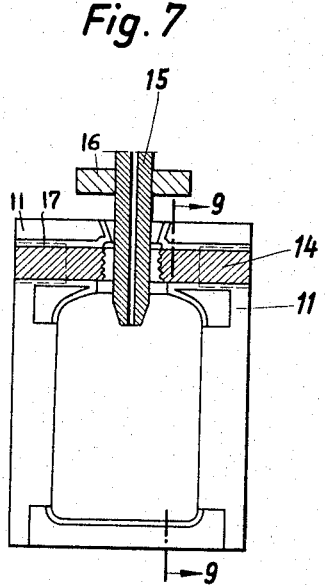
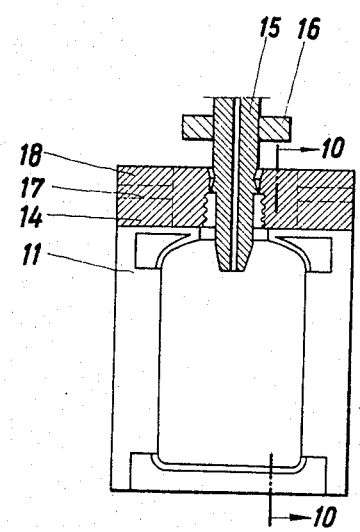
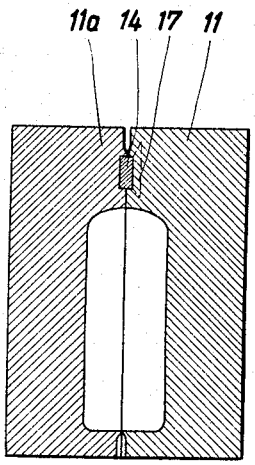
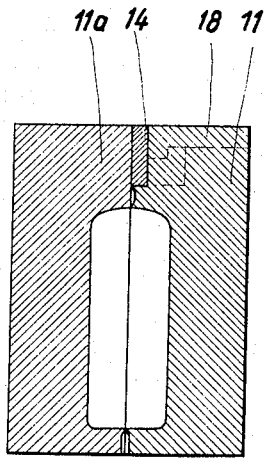
Inventor:
ERHARD LANGECKER
By Irwin S. Thompson
ATTY.

United States Patent Office 3,278,664
Patented Oct. 11, 1966

3,278,664
METHOD FOR PRODUCING HOLLOW BODIES FROM THERMOPLASTIC MATERIALS
Erhard Langecker, Hohbuschener Weg, Meinerzhagen, Westphalia, Germany
Filed Sept. 14, 1962, Ser. No. 223,690
Claims priority, application Germany, Sept. 15, 1961, L 40,027
3 Claims. (Cl. 264—98)

This invention relates to the production of hollow bodies, for example, bottles or the like, from thermoplastic materials, such as polystyrene, polyethylene or polypropylene. In producing bottles from hose blanks, one type of construction involves making the hose diameter smaller than the outer diameter of the bottle neck to be formed. The latter is then brought up to the requisite neck diameter by subsequently being blown up. An advantage of this process is that the hose retains its full cross section and, thus, a higher strength of the bottle neck is obtained. The drawback is that the neck aperture is not calibrated and later has to be bored through or reamed out. In a second method, the diameter of the extruded hose is made greater than the neck diameter of the bottle, and, during the closure of the mould, the latter being of multi-part construction, a part of the hose material along the bottle neck is squeezed together or squeezed off. The disadvantage of the process is that the axial weld seam reduces the mechanical strength as a result of the squeezing off. The advantage is, however, that either before, during or after the closing of the mould, a core can be inserted in the hose and the neck aperture calibrated. Subsequent boring through or reaming out can, therefore, be dispensed with. It is, however, necessary for certain types of hollow bodies, and particularly bottles, that the neck of the bottle be particularly strong. The same is true with respect to pipe fittings, such as pipe-Ts and the like, and, in particular, the outlet end of such pipe fittings.

In order to obtain a reinforcement of the neck cross-section in such cases, it has already been proposed to upset the neck in the axial direction after closing the mould. If the hose diameter is made so large that, in closing the mould, a portion of the hose is squeezed together at the bottle neck, then, in spite of upsetting the neck in the axial direction, there is still produced a more or less pronounced groove which deleteriously affects the tightness of the stopper subsequently inserted in the bottle neck. This is particularly true in the bore of the bottle neck at the hose folds. Thus, it becomes necessary to make the stopper somewhat larger and to insert it with greater pressure in the bottle neck. This may easily cause the neck to crack at the weld seam, where the mechanical strength is less.

The present invention is intended to overcome this drawback. For this purpose squeezed material lying outside the finished blown body is pressed inwards after or during the closing of the multi-part mould.

Specific embodiments of the invention will now be described by way of example with reference to the accompanying drawings, in which:

FIGURE 1 is a vertical sectional view, taken along the line 1—1 of FIGURE 2, and illustrating a closed two-part mould before the pressing-in of the squeezed part of the bottle neck;

FIGURE 2 is a sectional view taken along the line 2—2 of FIGURE 1;

FIGURE 3 is a vertical sectional view of the closed mould illustrated in FIGURE 1, after the insertion of the squeezed hose portion for reinforcing the bottle neck, and taken along the line 3—3 of FIGURE 4;

FIGURE 4 is a sectional view taken along the line 4—4 of FIGURE 3;

FIGURE 5 is a view similar to FIGURE 2, but with a different position of the pushers for the insertion of the squeezed portion;

FIGURE 6 is a view similar to FIGURE 5 with the pushers inserted;

FIGURE 7 illustrates a modification, in which the pushers are guided in a groove, bounded above and below, of the half-mould;

FIGURE 8 illustrates a further modification in which the pusher lies in a groove bounded downwardly;

FIGURE 9 is a sectional view taken along the line 9—9 of FIGURE 7; and

FIGURE 10 is a sectional view taken along the line 10—10 of FIGURE 8.

If a hose is worked to form a bottle, for instance, then the hose emerging from the extrusion nozzle perpendicularly downwards can either be introduced direct into the mould or brought into the mould after removal from the extrusion nozzle and forced over a blower core entering the hose. It is, however, also possible to arrange the blower core so that it projects out of the extrusion nozzle or, the hose can be cut off from the nozzle and introduced into the mould downwards or sideways and the blower core inserted from above or below into the hose before, during or after the closing of the mould.

In the embodiment shown in FIGURES 1 to 6, the mould consists of two mould parts 11, which can be moved together or apart in any known and suitable manner. The extruded hose component 12 lies between the two parts of the mould, and the blower core 15 is inserted from the above into the hose. Two pushers 14 are movably supported in the blower mould. When the two parts of the mould are closed after the insertion of the hose, the cut-off portion of the hose located in the mould assumes the shape shown in FIGURES 1 and 2. That is, the central portion of the hose retains its original form, the lower portion 12a is squeezed off, while the upper portion 13 is squeezed together laterally between the two halves of the mould in the manner shown in FIGURE 2. In this manner, the squeezed-off flaps 13a are formed towards the two sides. The pushers 14 are in the retracted position shown in FIGURES 1 and 2. It is clear that each guide slot formed in each of the two halves of the mould for the pushers 14 is only partly filled when the pushers are retracted.

After the closure or shortly before the end of the closure movement, the two pushers 14 are moved in a radial direction against the blower core 15, which direction may even be oblique to the blower core. By this movement, the material 13 located in the pusher groove is pressed into the bottle neck. At the same time or even earlier, the central portion of the hose itself can be blown out by air introduced through the blower core.

After the blowing of the central hose portion, and the movement towards one another of the two pushers 14 against a stop generally designated by the reference character 19, for determining the exact formation of the bottle neck, the workpiece has the form shown in FIGURE 3.

The movement of the pusher 14 can be effected in any manner desired. Preferably a piston actuated by compressed air is used for this purpose; to this end, the blower air can be used for the compressed air. The pusher is then returned by means of springs or by mechanical actuation which is initiated by the subsequent opening of the mould. It is, of course, possible, if the blower core is hydraulically or pneumatically retracted, for the pusher to be actuated by the same control member.

The finished-blown bottle as shown in FIGURE 3 is then, after the mould is opened, pushed down from the blower core by a stripper ring 16, and the remaining waste pieces 12a and 13a removed in any known and suitable manner. The piece 13a which is a part of the squeezed portion 13, is squeezed off by the pushers 14 in their closure movement.

While, in the embodiment shown in FIGURES 1 to 4, each of the pushers 14 is half-supported in each of the two parts of the mould, in FIGURES 5 and 6 each of the pushers is completely supported in one of the two halves of the mould. Otherwise the mode of operation is exactly the same as already described.

In the embodiment shown in FIGURE 7 the pushers lie in grooves bounded upwardly and downwardly, so that all the squeezed-off material is pushed together at the neck. In this connection the pushers 14 can be guided, as shown in FIGURE 9, by means, for instance, of a dovetail 17 in one half of the mould.

In the embodiment shown in FIGURES 8 and 10 a guide 18 is provided for the pushers 14, and here again, each of the pushers lie completely inside of one of the halves of the mould.

Of course, the various embodiments of the guides disclosed are exemplary only, and in all cases the form and movement of the pushers can be chosen at will.

It is preferable to select a form of construction in which the hose-shaped blank is open at the neck side so that the blower core is introduced in the hose blank before the mould is closed. The neck can thence be calibrated when closing the mould. The invention can, however, also be used for those methods of production in which the hose is closed at the neck side and the blower core (which is then sharp-pointed) is inserted therewithin only after the closure of the mould. Of course, it is possible for the pushers 14 not to be actuated until the blower core has reached its end position.

In producing bottles it is preferable to use hose blanks, but the invention can also be used for producing other hollow bodies, such as pipe fittings or other fittings, or the like, made from sheets or strips superimposed and to be welded together, in which the starting components of the particular pieces are treated correspondingly to the bottle necks.

What I claim is:

1. A method of producing a hollow body having a neck portion from a blank of plastic material, comprising extruding a tubular member, closing a pair of die members having a body portion and a neck portion which form a mold cavity about said tubular member so that the neck portion of said die members pinch a portion of said tubular member between the parting line of said die members, and then pressing inwardly the pinched material toward the neck portion of the mold cavity, and then blowing the remainder of the tubular member against the body portion of said die members.

2. A method as claimed in claim 1, wherein the pinched portion of said tubular member is pressed inwardly duirng closing of the mold.

3. A method as claimed in claim 1, wherein the pinched portion of said tubular member is pressed inwardly subsequently to the closing of the mold.

References Cited by the Examiner
UNITED STATES PATENTS

| | | | |
|---|---|---|---|
| 2,928,120 | 3/1960 | Leghorn et al. | 18—55 XR |
| 2,991,500 | 7/1961 | Hagen | 264—98 |
| 3,009,196 | 11/1961 | Hagen | 18—55 XR |
| 3,021,559 | 2/1962 | Strong | 18—55 XR |
| 3,069,722 | 12/1962 | Kato | 18—5 |
| 3,081,489 | 3/1963 | Jackson | 18—5 |
| 3,125,619 | 3/1964 | Miller | 264—98 |
| 3,127,458 | 3/1964 | Scott | 264—98 |

ROBERT F. WHITE, *Primary Examiner.*

MORRIS LIEBMAN, *Examiner.*

M. H. ROSEN, J. R. HALL, *Assistant Examiners.*